United States Patent [19]

Puta

[11] 4,004,040
[45] Jan. 18, 1977

[54] WHIPPED HONEY SPREAD

[76] Inventor: Ruben W. Puta, Box 46, St. Nazianz, Wis. 54232

[22] Filed: Apr. 8, 1976

[21] Appl. No.: 674,978

Related U.S. Application Data

[63] Continuation of Ser. No. 522,481, Nov. 11, 1974, abandoned.

[52] U.S. Cl. .............. 426/564; 426/474; 426/519; 426/524; 426/658
[51] Int. Cl.² .......................... A23L 1/08
[58] Field of Search ......... 426/312, 474, 519, 524, 426/564, 572, 658, 660; 261/DIG. 16, DIG. 26; 259/191, DIG. 30, DIG. 31, DIG. 32; 99/348

[56] References Cited

UNITED STATES PATENTS

| | | | |
|---|---|---|---|
| 1,854,430 | 4/1932 | Stratton | 426/658 X |
| 1,908,454 | 5/1933 | Snider | 426/474 X |
| 2,052,358 | 8/1936 | Lund | 426/564 |
| 2,680,879 | 6/1954 | Schnuck et al. | 259/191 |
| 2,774,578 | 12/1956 | Spiess et al. | 261/DIG. 16 |
| 2,784,096 | 3/1957 | Ciccone | 426/474 |
| 2,909,433 | 10/1959 | Morrison | 426/524 X |

Primary Examiner—S. Leon Bashore
Assistant Examiner—Marc L. Caroff
Attorney, Agent, or Firm—Michael, Best & Friedrich

[57] ABSTRACT

A whipped honey spread having a butter-like consistency and capable of extended on-shelf storage periods without substantial syneresis or crystallization is produced by introducing a liquefied, unpasteurized natural honey into a closed chamber, shearing and agitating the honey at a temperature of about 50° to 60° F in the closed chamber in the presence of an inert gas, such as air, and at superatmospheric pressure for a sufficient time to incorporate and uniformly distribute many minute bubbles of the gas throughout the honey, withdrawing a whipped or aerated, syrup-like product from the chamber, and storing this product in a mildly refrigerated atmosphere for curing to a butter-like consistency. The process is readily adaptable for a continuous operation.

12 Claims, 4 Drawing Figures

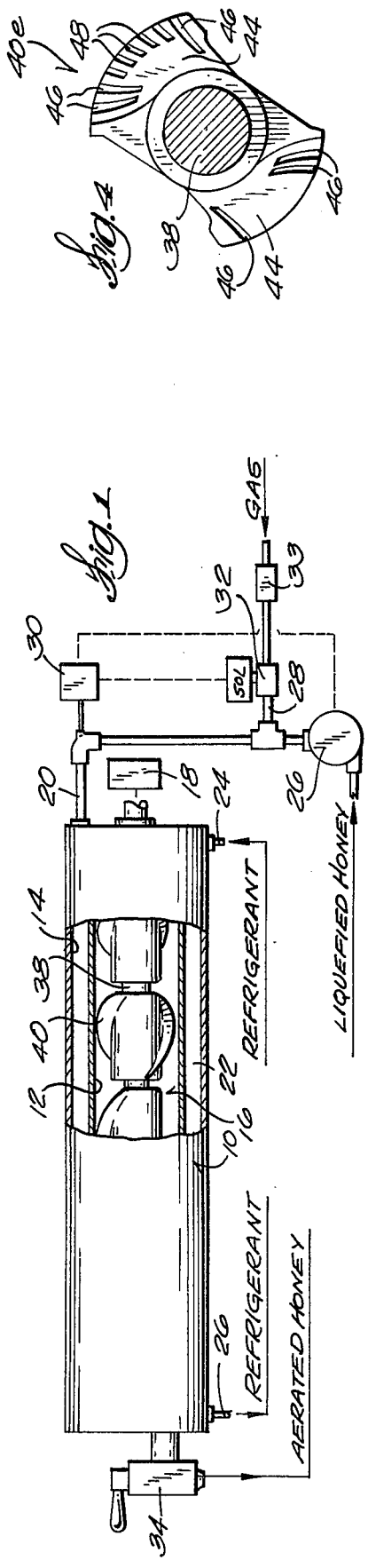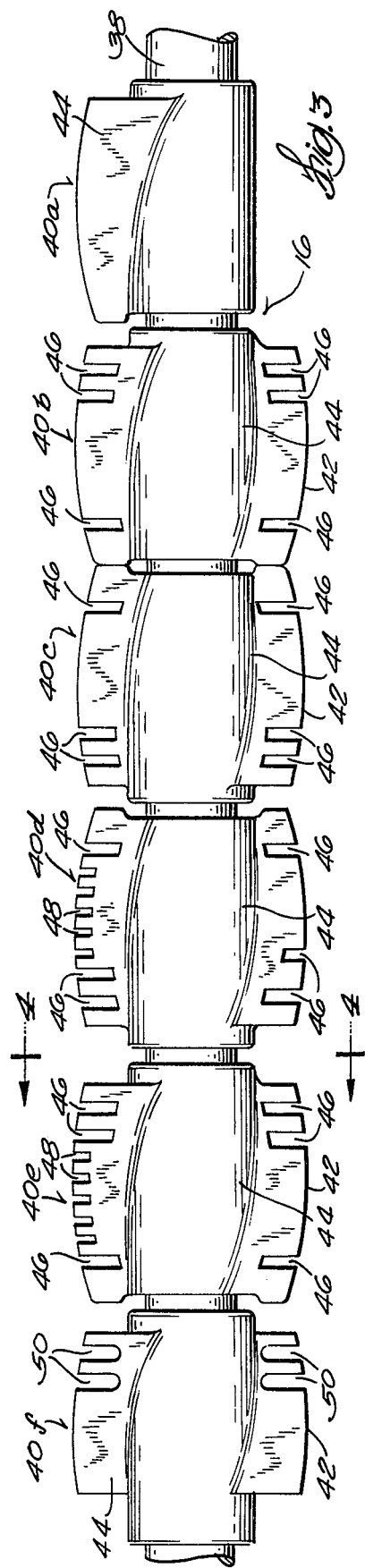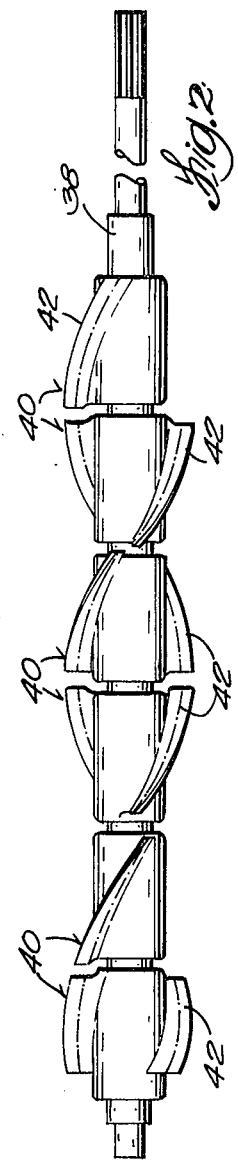

WHIPPED HONEY SPREAD

This is a continuation of application Ser. No. 522,481, filed Nov. 11, 1974, now abandoned.

BACKGROUND OF THE INVENTION

This invention relates to honey and, particularly, to a whipped honey spread having a butter-like consistency and a method for making same.

Upon exposure to sunlight and relatively cold temperatures natural honey tends to crystallize and become somewhat granular in consistency. In this form the honey loses its value as a food-stuff because it cannot be spread onto bread, crackers, pancakes, and the like. Granulated honey can be liquefied by heating, but when applied to other foodstuffs, the liquefied honey tends to "run" or drip off the foodstuff to which is has been applied.

Spreadable honey products made by some prior art processes are highly susceptible to syneresis or liquid separation. Other prior art processes have been aimed at overcoming this shortcoming. For example, U.S. Pat. No. 1,908,454 describes a process for making a churned honey in which the honey, at the threshold of crystallization, is placed in an open container and then agitated while being exposed to air for 45 to 90 minutes at a temperature between 100° and 110° F. U.S. Pat. No. 1,987,893 describes a process including the steps of first heating the honey to an elevated temperature (e.g., 160° F) to destroy the yeasts contained in the honey, rapidly curing the liquefied honey to about 75° F while agitating in an open container, mixing a quantity of crystallized honey into the cooled liquid honey and, upon completion of mixing, curing at a temperature to promote crystal formation.

U.S. Pat. No. 2,052,358 describes a process similar to the process of U.S. Pat. No. 1,987,893 in which a surface tension depressant, such as albumen, is mixed into the honey. In addition to the costs associated with the multiple steps of these processes, the products made therefrom tend to harden within relatively short on-shelf storage periods. Furthermore, all of these processes are batch processes.

SUMMARY OF THE INVENTION

A principal object of the invention is to provide a whipped honey spread which is capable of being stored under normal on-shelf conditions for extended periods without substantial syneresis or crystallization.

Another principal object of the invention is to provide an inexpensive process for making such a whipped honey spread product.

A further principal object of the invention is to provide a continuous process for making a whipped honey spread.

Other objects, aspects, and advantages of the invention will become apparent upon reviewing the following detailed description, the drawing and the appended claims.

It has been found that a whipped honey spread having a butter-like consistency and the capability of being stored under normal on-shelf conditions for periods up to 1 year or more can be produced by introducing an unpasteurized, natural honey in liquefied form, with or without flavor additives, into a closed chamber, shearing and agitating the honey inside the chamber in the presence of a gas at a superatmospheric pressure, and which is safe for human consumption and will not deleteriously affect yeasts in the honey, for a sufficient time to incorporate and uniformly distribute minute bubbles of the gas throughout the honey, withdrawing a syrup-like product from the chamber and curing the same to a butter-like consistency.

BRIEF DESCRIPTION OF THE DRAWINGS

FIG. 1 is a diagrammatic view of exemplary apparatus for practicing the process of the invention, including a refrigeration chamber shown partially broken away to expose an internal auger.

FIG. 2 is an elevational view, partially broken away, of the auger shown in FIG. 1.

FIG. 3 is an enlarged view of the auger shown in FIG. 2 illustrating a preferred slot arrangement for the blade segments of the auger.

FIG. 4 is a sectional view taken along the line 4—4 in FIG. 3.

DESCRIPTION OF THE PREFERRED EMBODIMENTS

Referring to FIG. 1, exemplary apparatus for practicing the process of the invention includes an elongated mixer 10 having a closed, inner cylindrical mixing chamber 12, an outer cylindrical chamber 14 and a screw type auger 16 rotatably mounted inside the inner chamber 12 and driven by a conventional motor drive unit 18 for intermixing a gas and honey introduced through a supply line 20 into the forward end of the mixing chamber 12 and for propelling the contents from the forward end towards the aft end of the mixing chamber 12 (assisted by the pressure feed of the honey and gas). In order to maintain the mixing chamber at a predetermined temperature during the mixing, a controlled flow of refrigerant is introduced into the annular spacing 22 between the inner and outer chambers 12 and 14. The refrigerant is introduced into the spacing unit 22 through an inlet 24 located at the forward end of the mixer 10, flows over the outer wall of the mixing chamber 12 and exits from the spacing 22 through an outlet 26 located near the aft or discharge end of the mixer 10. To insure efficient heat transfer between the refrigerant and the mixing chamber 12, baffles the like (not shown) can be provided in the spacing 22 to define a spiral flow pattern for the refrigerant as it flows from the inlet 24 to the outlet 26.

Honey and a pressurized gas is automatically supplied to the mixing chamber 12 by a pump 26, such as a conventional two-lobe impeller type pump, a gas inlet 28 connected to the supply line 20 downstream of the pump 26 and a pressure switch 30. Introduction of the gas into the supply line 20 is selectively controlled by a normally-closed, solenoid-operated valve 32 located in the air inlet line 28. The flow rate of the gas is regulated by a regulator 33 located in the air inlet line 28.

Any clean, filtered inert gas which is safe for human consumption and will not adversely affect any yeasts contained in the honey can be used. Representative suitable gases include air, carbon dioxide, nitrogen, and mixtures thereof, with air being the preferred gas because of its cost and availability.

A whipped or aerated honey product is withdrawn from the mixing chamber 12 by opening a dispensing spigot valve 34 located at the aft or discharge end of the mixing chamber. The pressure switch 30 is operatively connected to the motor drive of the pump 26 and to the solenoid-operated valve 32 and operates through an electrical control system (not shown) in a conventional manner to cycle the pump 26 and the valve 32 on or off to maintain a predetermined pressure in the mixing chamber 12. If desired, the gas inlet 28 can be connected directly to the inlet end of the mixing chamber 12 instead of being connected to the supply line 20 as illustrated.

The starting honey used in the process is an uncooked or unpasteurized natural honey in liquefied form. In order to prevent syneresis or liquid separation of the resulting whipped honey spread, the starting honey should be substantially ungranulated. That is, granulation should not have proceeded past the very earliest stage where the honey has started to become slightly cloudy. If the honey is granulated past this stage, it can be heated to liquefication so long as the temperature is maintained below a level where pasteurization occurs, i.e., below a temperature at which yeasts, natural vitamins, minerals, etc., contained in the honey are destroyed. As a guide, most varieties of honey can be heated up to about 145° F without adversely affecting yeasts, minerals, natural vitamins, etc. For best results, the honey preferably should be allowed to set for at least 24 hours after extraction from the honey comb. When a slow granulating variety of honey is used, it can be stored or agitated for a short time period or transferred from one bulk storage tank to another at room temperature in order to accelerate granulation to the degree desired. The moisture content of the starting honey preferably should meet the requirements of U.S. Grade Standard No. 1.

If desired, various suitable color and flavor additives can be mixed into the honey prior to its introduction into the mixer. Also, dehydrated fruits, nuts, and the like, which have been finely divided or powdered by pulverization, grinding, hammering, etc., can be added to the honey prior to introduction into the mixer. While larger quantities can be used, generally about 1 ounce of these additives per 100 pounds of the honey is sufficient to provide a flavorful product.

The liquefied natural honey, without or with additives, is pumped from a bulk storage tank (not shown) into the mixer 10 by the pump 26 at ambient temperature and under a positive pressure, for example, at a pressure within the range of about 10 to 25 psig, preferably about 15 psig.

To obtain the best results, the amount of gas added to the mixing chamber 12 along with the honey feed is sufficient to increase the volume of the resultant product from about 10 to 15%, preferably about 12.5%, over the original volume of the honey introduced into the mixer. The pressure of the gas being introduced though the supply line 28 should be somewhat higher (about 3 to 5 psig) than the pressure of the honey flowing from the pump 26 so as to insure a positive blanket of the gas over honey during subsequent mixing.

In the closed mixing chamber 12, a vigorous shearing, agitating and blending action is imparted to the honey by the auger 16 in the presence of the gas at a superatmospheric pressure so as to incorporate many minute bubbles of the gas into the honey. In order to provide a whipped honey spread which will retain a smooth, butter-like consistency under normal on-shelf storage conditions (i.e., minimum exposure to direct sunlight) for periods up to 1 year or more, the gas bubbles incorporated into honey should be finally divided and uniformly distributed throughout the honey. This can be accomplished by maintaining a positive pressure in the mixing chamber 12 and arranging the auger 16 so that it whips or breaks down the honey into a finely subdivided state.

FIGS. 2 – 4 illustrate a preferred construction of the auger 16 for this purpose. The auger 16 includes a shaft 38 and a plurality of blade segments 40 (6 in the specific construction illustrated) mounted on the shaft. The blade segments 40 are axially spaced apart a small distance (about 7/16 inch) and preferably are angularly off-set from each other. The blade segments 40 include outer peripheral edges 42 which are closely spaced from inside wall of the mixing chamber 12 (about one-eighth inch) and working surfaces 44 which curve outwardly from the shaft 38 in a substantially tangential direction with respect to the shaft. The blade segments 40 and the shaft 38 form a generally helical-shaped auger adapted to move the contents in the mixing chamber 12 forwardly through the chamber as the shaft 38 is rotated in the counter-clockwise direction as viewed in FIG. 4. Thus, the liquefied honey is continously forced forwardly and outwardly towards the mixing chamber wall to thereby cause a continuous intermixing of the gas and the honey.

In order to more effectively break down the honey into a finely divided state so as to insure the incorporation and uniform distribution of many minute bubbles of the gas throughout the honey, at least some of the blade segments 40 are provided with a plurality of relatively narrow, elongated grooves or slots which extend inwardly from the outer peripheral edges 42. While each blade segment 40 can have the same number of slots of about the same dimension, it is preferred that the blade segments located closest to the supply and discharge ends of the mixing chamber 12 have fewer and larger slots than the intermediate blade segments. With this arrangement, the intermediate blade segments provide the majority of the intermixing of the honey and gas while the blade segment or segments located near the supply end of the mixing chamber primarily serves to initiate the forward movement of the contents and the blade segment or segments located near the discharge end of the mixing chamber primarily serves to discharge the product from the mixing chamber.

Referring to FIG. 3 as a guide for constructing an auger adaptable for practicing the process of the invention, the mixing chamber is approximately 24 inches long and has an inside diameter of approximately 4 inches and all the blade segments have an axial dimension of about 6 inches. The first blade segment 40a is solid. The peripheral edges 42 of each of the second and third blade segments 40b and 40c include three slots 46 of about the same dimensions (about 3/16 inch wide and about three-fourths inch deep). One peripheral edge of the fourth and fifth blade segments 40d and 40e, in addition to including three slots 46 similar to those in the second and third blade segments, includes five smaller slots 48 (about 3/32 inch wide and about three-eighths inch deep). The leading portion of the peripheral edge 42 of the sixth blade segment 40f includes two relatively large slots 50 (about one-fourth inch wide and about three-fourths inch deep) which serve primarily as a pressure relief.

During mixing, the mixing chamber 12, and thus the contents therein, preferably is maintained at a temperature within the range of about 50° to 60° F, most preferably at a temperature of about 57° F, by providing an appropriate flow of refrigerant though the spacing 22 between the mixing chamber 12 and the outer chamber 14.

After a start-up period of a few minutes (about 3 minutes or more) to obtain intermixing of the gas and the initial charge of the honey, a whipped product in a pourable, relatively heavy, syrup-like form can be dispensed from the mixing chamber 12 on a substantially continuous basis into containers or packages to be used for sale of the whipped honey spread. As product is withdrawn from the mixing chamber 12 and pressure therein drops below a predetermined level (e.g. about 15 psig), the pressure switch 30 initiates the energization of the pump 26 and the solenoid-operated valve 32 and additional honey and gas are introduced into the mixing chamber 12. When the pressure inside the mixing chamber 12 again reaches the predetermined level, the pressure switch 30 is actuated to shut off the pump 26 and close the valve 32. If desired, a time delay can be incorporated into the control system to delay opening of the valve 32 for about 1 second or so after the pump 26 is started.

After the product has been withdrawn from the mixing container 12 and introduced into suitable packages or containers, it is stored in a dry, mildly refrigerated atmosphere for curing or gelling to a semi-solid or butter-like consistency. When spread with a knife or the like at room temperature, the cured whipped honey products has a consistency similar to that of soft peanut butter. The particular curing temperature used depends primarily upon the specific variety of honey being processed. Generally, a curing temperature within the range of about 50° to 60° F, preferably about 57° F, is used. Temperatures lower than 50° F can be used; however, the curing time will be significantly retarded. While shorter curing periods can be used, a time period of about 14 days or longer has been found to produce the best results.

After reviewing the foregoing detailed description of the preferred embodiments, it will become apparent to those skilled in the art that various modifications and alterations can be made thereto without departing the spirit and scope of the invention.

I claim:

1. A process for making a whipped honey spread consisting essentially of the steps of
    introducing a feed consisting essentially of unpasteurized natural honey in liquefied and substantially ungranulated form into a closed chamber,
    introducing into said chamber an inert gas which is safe for human consumption and will not deleteriously affect yeasts contained in said honey,
    shearing and agitating said honey inside said chamber in the presence of said gas and under superatmospheric pressure, while maintaining said honey at a temperature from about 50° to 60° F, to incorporate and uniformly distribute minute bubbles of said gas throughout said honey,
    withdrawing a resulting whipped product from said chamber, and
    curing said product to a butter-like consistency.

2. A process according to claim 1 wherein said honey is maintained at a temperature of about 57° F during said shearing and agitating.

3. A process according to claim 1 wherein the quantity of gas introduced into said chamber is sufficient to increase the original volume of said honey introduced into said container from about 10 to about 14%.

4. A process according to claim 3 wherein said gas is air.

5. A process according to claim 1 wherein said product is maintained at a temperature within the range of about 50° to about 60° F during curing.

6. A process according to claim 5 wherein said product is maintained at a temperature of about 57° F during said curing.

7. A process according to claim 5 wherein the time period of said curing is at least 14 days.

8. A process according to claim 1 wherein the pressure inside said chamber is within the range of about 10 to about 25 psig.

9. A process for making a whipped honey spread consisting essentially of the steps of
    introducing a feed consisting essentially of unpasteurized, natural honey in liquefied and substantially ungranulated form into a closed chamber,
    introducing into said chamber a pressurized inert gas which is safe for human consumption and will not deleteriously affect yeasts contained in said honey,
    shearing and agitating said honey inside said chamber in the presence of said gas and under a pressure within a range of about 10 to 25 psig, while maintaining said honey at a temperature of about 50° to about 60° F, to incorporate and uniformly distribute minute bubbles of said gas throughout said honey, the temperature of said chamber being maintained at a temperature of about 50° to 60° F during said shearing and agitating,
    withdrawing a resulting whipped product from said chamber, and
    curing said product at a temperature within the range of about 50° to 60° F for a minimum of 14 days.

10. The cured product produced by the process of claim 9.

11. A process for making a whipped honey spread consisting essentially of the steps of
    introducing a feed consisting essentially of unpasteurized, natural honey in liquefied and substantially ungranulated form and at a pressure within the range of about 10 to 25 psig into the inlet end of an elongated closed chamber,
    introducing air into said chamber at a pressure higher than the pressure of said honey feed,
    shearing and agitating said honey in the presence of said air inside said chamber with a screw type auger including slotted blade segments having a peripheral edge spaced inwardly from the inner wall of said chamber, while maintaining said honey at a temperature from about 50° to about 60° F, to thereby incorporate and uniformly distribute minute bubbles of said air throughout the mass of said honey,
    continuously withdrawing a quantity of a resulting whipped honey product from the outlet end of said chamber, and
    curing said product to a butter-like consistency.

12. A process according to claim 11 wherein said product is maintained at a temperature within the range of about 50° to 60° F for at least 14 days during said curing.

* * * * *